(12) United States Patent
Gauthier

(10) Patent No.: US 9,963,188 B2
(45) Date of Patent: May 8, 2018

(54) BICYCLE FRAME ASSEMBLY

(71) Applicant: Michel André Gauthier, Alexandria, VA (US)

(72) Inventor: Michel André Gauthier, Alexandria, VA (US)

(*) Notice: Subject to any disclaimer, the term of this patent is extended or adjusted under 35 U.S.C. 154(b) by 0 days. days.

(21) Appl. No.: 15/621,659

(22) Filed: Jun. 13, 2017

(65) Prior Publication Data
US 2017/0355416 A1 Dec. 14, 2017

Related U.S. Application Data

(60) Provisional application No. 62/349,318, filed on Jun. 13, 2016.

(51) Int. Cl.
| | | |
|---|---|---|
| *B62K 19/00* | (2006.01) | |
| *B62K 19/08* | (2006.01) | |
| *B62K 19/18* | (2006.01) | |
| *B62K 19/30* | (2006.01) | |

(52) U.S. Cl.
CPC .............. *B62K 19/08* (2013.01); *B62K 19/18* (2013.01); *B62K 19/30* (2013.01); *B62K 2700/10* (2013.01); *B62K 2700/20* (2013.01); *B62K 2700/34* (2013.01); *B62K 2700/38* (2013.01)

(58) Field of Classification Search
CPC .............. B62K 9/10; B62K 9/16; B62K 19/08
See application file for complete search history.

(56) References Cited

U.S. PATENT DOCUMENTS

| | | | | |
|---|---|---|---|---|
| 4,613,146 | A * | 9/1986 | Sharp | B62K 3/02 |
| | | | | 280/288.2 |
| 4,850,607 | A * | 7/1989 | Trimble | B29C 70/342 |
| | | | | 280/281.1 |
| 5,011,172 | A * | 4/1991 | Bellanca | B62K 19/02 |
| | | | | 264/258 |
| 8,272,659 | B2 * | 9/2012 | Meredith | B62K 19/08 |
| | | | | 280/288.4 |
| 9,168,967 | B2 * | 10/2015 | Choi | B21D 53/86 |
| 9,248,880 | B2 * | 2/2016 | Haimoff | B62K 3/02 |
| 9,254,885 | B2 * | 2/2016 | Choi | B23P 15/00 |
| 2003/0189308 | A1 * | 10/2003 | Wegzyn | B62K 19/08 |
| | | | | 280/281.1 |
| 2009/0146391 | A1 * | 6/2009 | Sutherland | B62K 15/006 |
| | | | | 280/287 |
| 2012/0013101 | A1 * | 1/2012 | Huang | B62K 3/04 |
| | | | | 280/287 |
| 2015/0054249 | A1 * | 2/2015 | Gafni | B62K 3/02 |
| | | | | 280/263 |

* cited by examiner

*Primary Examiner* — Kevin Hurley
(74) *Attorney, Agent, or Firm* — Dale J. Ream

(57) ABSTRACT

A bicycle frame assembly includes a first trimmed panel having a planar configuration defining a first plane and a second trimmed panel having a planar configuration defining a second plane. The first and second trimmed panels have a predetermined shape configuration and are positioned such that the first plane and second plane intersect. The bicycle frame assembly includes trimmed panels that include planar panels that define two, four, or even six planes.

10 Claims, 8 Drawing Sheets

BICYCLE FRAME ASSEMBLY

REFERENCE TO RELATED APPLICATIONS

This application claims the benefit of provisional patent application U.S. 62/349,318, filed Jun. 13, 2016 entitled BICYCLE FRAME which is incorporated herein in its entirety.

BACKGROUND OF THE INVENTION

Field of the Invention

The present invention relates to a new bicycle frame assembly with a structurally planar frame that includes a plurality of geometrically planar components that may be easily constructed and provided for quick assembly. The planar parts are assembled with fastening mechanisms.

Description of the Related Art

Bicycles have been a means for transportation and recreation through the ages. They have evolved over the years in different ways, especially to be faster, lighter, and more aesthetically pleasing. According to industry standards, one variation in structure, referred to as the "diamond-shaped" frame, and as a "step-through" frame, with an upwardly or downwardly extending front tube. The "step-through" frame is configured to allow a user to either step over or through and to be seated before pedaling. Yet another variation, referred to as a "tricycle frame" includes a rear axle support, and has a downwardly extending front tube. Yet other variations to frames, involve a frame for a "recumbent bicycle" configured to place a rider in a laid-back reclining position. Another variation is configured for a hand-cycle that is powered by arms rather than legs, a folding frame that may be assembled and disassembled into a compact form, and a frame facilitating tandem use for riding by more than one person. To date, all of these frames utilize tubular parts.

Conventionally, bicycle frames are manufactured using a plurality of welded tubular sections. Chronologically in the history of bicycle development, successive alloy materials have been used, including but not limited to, steel, aluminum, magnesium, titanium, and more recently, fibers composite and thermoplastics. Over time, the geometry of bicycles remained generally similar. However, there was great progress in the evolution of the materials used. The evolution of the materials was independent of the different concepts, structures, and geometric types.

Typically, existing bicycles are assembled by suitable technical processes developed in accordance with the properties of the materials used for example by braze welding on metals or by gluing.

For example, tubular housings configured to receive a headset, bottom bracket, and seat tube is either welded or glued, interconnecting permanently the other members to form the cycling frame. Once assembled, the parts of the bicycle frame cannot be disassociated with all its inherent disadvantages.

The use of tubular elements has structural limitations, thereby limiting an array of new types of materials that are not used by the bicycling industry. The materials currently used, although beneficial, are expensive and may restrict the frame's performance and strength characteristics in some ways. Ergonomically, the current methods limit the sizing flexibility between the upper torso (front triangle) and the legs (rear triangle).

Different types of plate frame elements have been proposed. For example, U.S. Pat No. 2009/0146391 discloses one type of frame configuration formed by a frame from vertical and parallel plates. This method uses a plurality of fasteners and spacers to compensate for the sheer force resulting from their offset. This method and configuration that uses such plates and fastenings defeats the purpose of speed as the bicycle is neither light nor easily propelled due to the significant mass added to each of the plate's elements. In addition, the risks of failure, and additional weight because of the number of bolts and nuts used in the fastening system, are increased exponentially.

Regardless of the type of selected material, the process for manufacturing a conventional bicycle includes at least nine different steps to be fabricated. Each requires simplification for manufacturing, by new computer-aided designs, manufacturing programs, and conceptual approaches.

Despite the fact that the tubular system is a minimalist optimized engineering method that has endured through the years and been greatly improved, there remains a dire need for new apparatus design and methods that are practical in today's world and designed to embrace new advanced technologies and environment sensibilities. New material types allow more sustainable and versatile solutions for use all over the world.

SUMMARY OF THE INVENTION

The present invention is directed to the concept of modularizing a bicycle frame to create a bicycle, in this instance, by constructing a three-dimensional structure characterized by the geometry of intersecting planes. The frame structure is fabricated by adopting the standard dimensioning of the bicycling industry for frame sizes and operational components. The structural elements, configured to be planar and independent, are connected by fastening mechanisms—forming a rigid assembly with exceptional physics properties.

The systems, methods, and devices described herein have innovative aspects. Although most of the aspects are described in connection with a bicycle frame, it should be appreciated that the various embodiments can also be applied to other frame types of the bicycling industry, as well as to others frames that are configured for holding at least one wheel. Without limiting the scope of the claims, some of the innovative aspects will now be summarized.

In one embodiment, a bicycle frame comprises two independent planar elements, dependent solely on a symmetrical layout structure composed of an arrangement of two intersecting planes which are trimmed on a delineated diamond-shaped frame, including a front and a rear triangle. Fastening mechanism connections are configured to couple the two planar elements at the headset of a bicycle, at the bottom bracket, at the seat receiver, and at the dropouts when the rear wheel is installed. At their intersecting lines, the two planar elements are slidably joined together, such as by a sliding lap-joint configuration, with or without an additional means of connection.

In another embodiment, a bicycle frame comprises four independent planar elements that depend solely on a symmetrical layout structure composed of an arrangement of four intersecting planes, which are trimmed on delineated front arms and a rear triangle. The similar fastening mechanisms join the planar elements in a similar fashion. A variant connection at the bottom bracket integrates a limit-friction bushing between the front arm and the rear triangle.

The planar elements made from pre-manufactured panels are constructed from a plurality of materials and process types with variable thickness values allowing optimization of their structural properties. Their delineated shapes can be designed to address structural properties and/or ornamental purpose. Their edge treatments are achieved simply by different numerical control machinery (C.N.C.) or the like.

The structural system includes modular elements and fastening mechanisms and couplings allow a user to disassemble and reassemble the frame with identical or alternate modular elements, with different mechanical properties or different function or ornamental purpose, and in certain configuration assemblies, install different structural alternatives, or ergonomic proprieties between the front and the rear triangle.

Another embodiment of the present invention and method of assembly allows all operational parts to be integrated into the interchangeable shell housing with their own standard dimensions. The fastening mechanisms coupling the planar elements and the housings of different operational parts form a singular device. More precisely, their widths correlate to the respective planes' definition. A person skilled in the art can imagine custom operational parts to be integrated into these structure's types for specific applications.

The innovative bicycle frame according to the present invention has many advantages. The present bicycle frame provides a mechanism for quick and easy assembly, use of eco-friendly materials, transportability, and easy storage. It is made of non-tubular elements that are planar. Deflection knows as plate bending may be permitted and controlled. It is essentially a frame assembly with modular elements with the mechanical connector, therefore, constituting a dissociable frame.

It is understood that a planar element offers a plurality of materials with a diversity of internal structure types. They can include, but are not limited to, monolithic and homogeneous material, composite with or without cavities, or a combination thereof. In some embodiments, it may be made from durable plywood. In some embodiments, it has an interchangeable element using a fastening connector that provides sizing flexibility between the upper torso (front triangle) and the legs (rear triangle). It uses standard mechanical parts, for example, a bottom bracket, a crank set, a headset, etc. The innovative frame structure is relevant to many other bicycle types.

It allows the use of new materials for the industry standard. It creates a new method of construction for the industry standard. It has an inexpensive manufacturing process. It allows a plurality of new design appearances. It allows 100% sustainability. It is lightweight and therefore, easily transportable. It allows the use of material that reduces the frame weight in an unprecedented magnitude. It has tridimensional planar structures that are extremely favorable to fluid velocity and dynamics performances. It has a planar configuration, therefore, is easy to pack and to ship, because of its flat modular elements. Its unique design facilitates either inexpensive assembly or a more sophisticated assembly. It allows for full integration of innovative technologies from security, navigation systems, auxiliary mode of propulsion, air flow and drag management. The inexpensive and transportable qualities facilitate shipping of such bicycles to developing countries or countries facing catastrophic recovery, in support of humanitarian efforts.

Some illustrative and non-limiting examples of the bicycle frame according to the present invention are described below, with reference to the figures.

BRIEF DESCRIPTION OF THE DRAWINGS

The present invention is illustrated by way of example, and not by way of limitation in the figures of the accompanying drawings in which like reference numerals are used to refer to the same or similar elements.

DESCRIPTION OF THE PREFERRED EMBODIMENT

Before the present inventive subject matter is described in further detail, it should be understood that the inventive subject matter is not limited to the particular embodiments described; these may, of course, vary. It is also to be understood that the terminology used here is for describing particular embodiments only, and is not intended to be limiting since the scope of the inventive subject matter will be limited only by the appended claims.

A bicycle frame assembly according to a preferred embodiment of the present invention will now be described in detail with reference to FIGS. 1 to 13 of the accompanying drawings.

Figure 1:
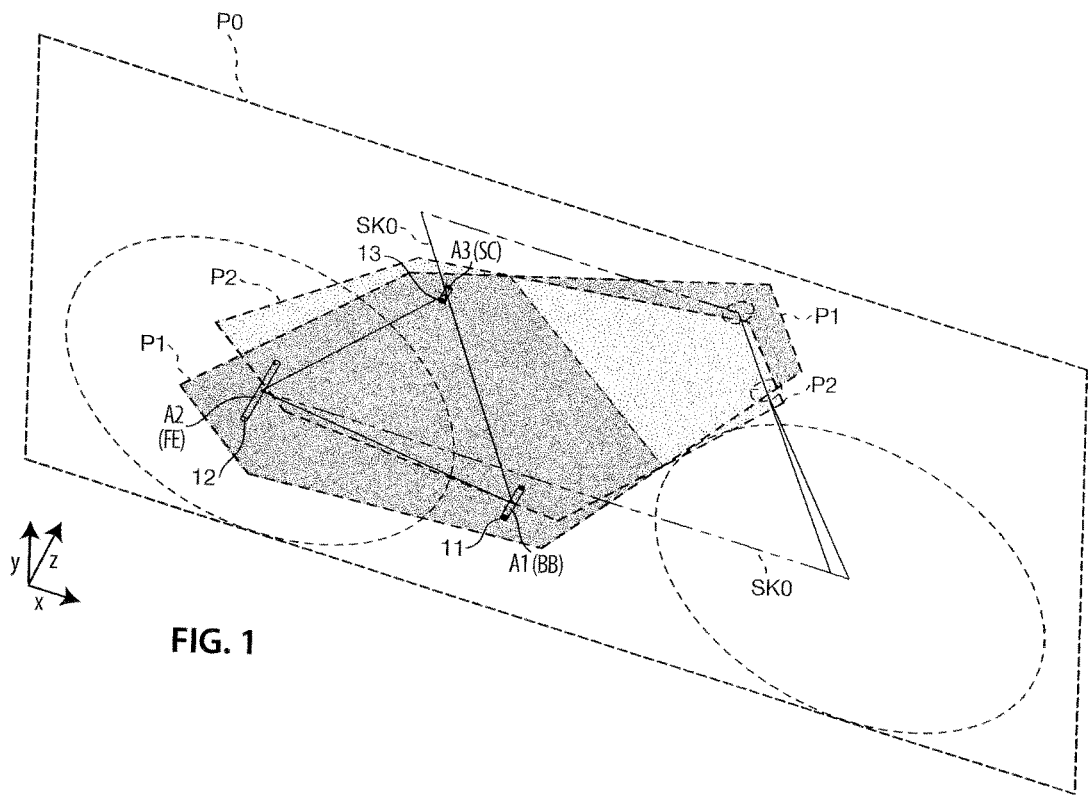
FIG. 1 is a perspective view of the tridimensional frame structure comprising two symmetrical planes.
Figure 2:
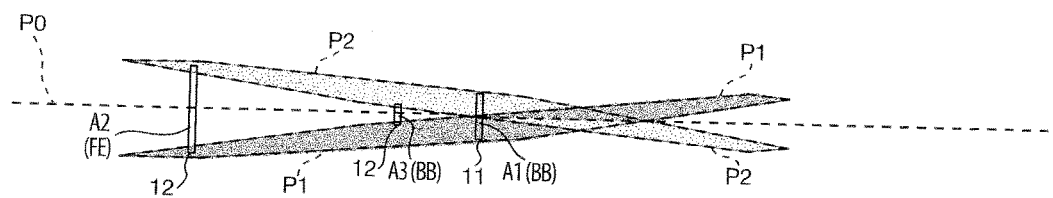
FIG. 2 is a top view of the tridimensional frame structure comprising two symmetrical planes.
Figure 10:
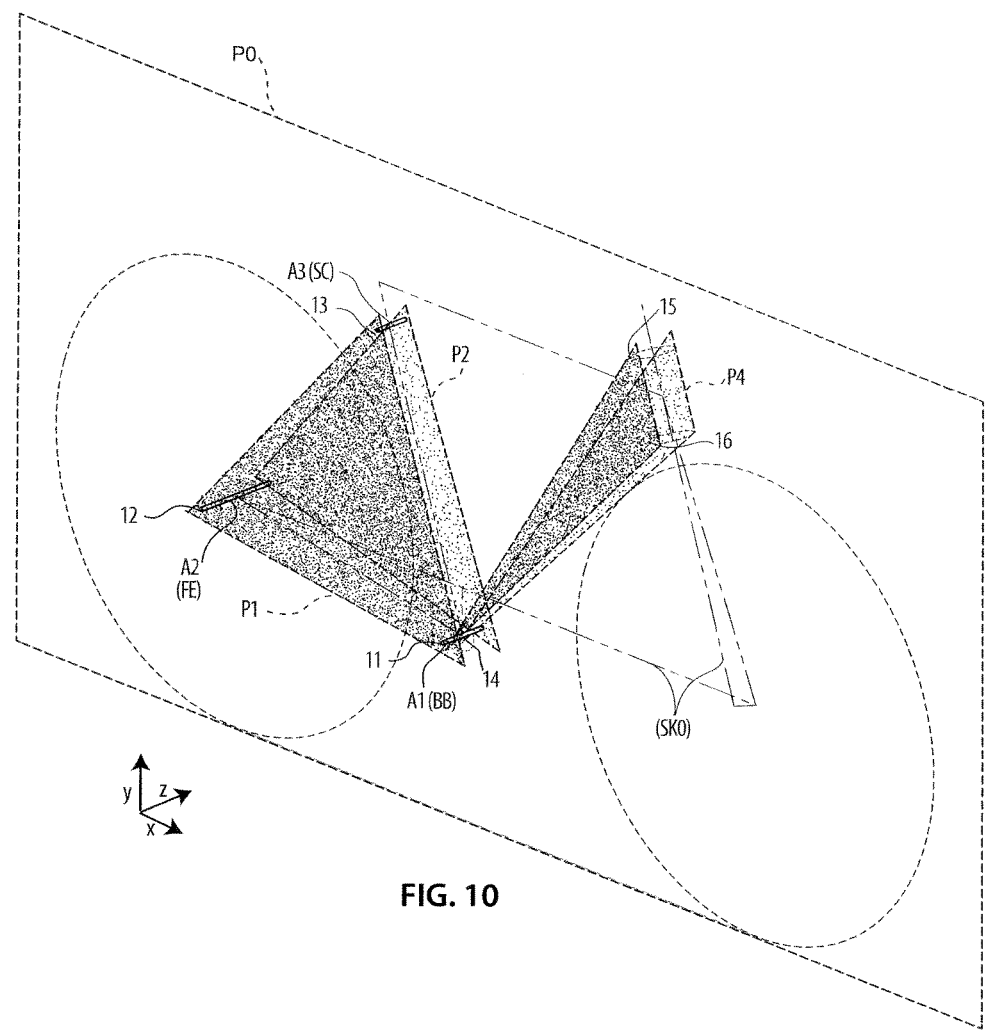
FIG. 10 is the tridimensional frame structure comprising four symmetrical planes.

One embodiment is shown in FIG. 1 & FIG. 2 and illustrates the tridimensional structure having a frame that defines two planes defining the construction of the frame as a whole. The plane P0 represents the reference feature: frame centerline as a vertical plane of symmetry (coordinates x and y) running from the headset axis, and by the center of the bottom bracket shell and dropout spacing (FIG. 10). The geometry of the bike frame comprises a two-dimensionally sketched SK0 positioned on plane P0, as references only, and varied accordingly. In the perpendicular axial direction of P0 (coordinate z), are indicated: the axial spindle length A1 as the standard width of so-called bottom bracket (BB) location, the axis A2 as the standard spacing at the fork ends location (FE), and the axis A3 as the width at the seat cluster (SC) location. The plane P1 (drive side) is defined as running by three points: point 11 at a bottom bracket assembly (BB), point 12 at the fork ends spacing (drop out spacing), and point 13 at the seat post cluster (SC).

Plane P2 (non-drive side) is the symmetrical plane of P1 relative to the centerline plane P0. The consequent width at the headset 160 between the planar elements is a correlation of the three determinate points on z coordinate 11, 12, 13, and its selected element thickness.

The bottom bracket (BB) width (denoted in the drawings as A1) has generally a standard spindles lengths value ranging from 72 to 93 mm but optimized in this example for a value of 73 mm, which determines the point 11 on z coordinate. A person skilled in the art knows that the spindle length determines the relationship between the centerline (Plane P0) and the bottom bracket, thus ensuring the correct position of the crankset relative to the plane P0. The fork ends spacing (FE) or O.L.D. (Over-Lock-nut-Distance) connection width (denoted in the drawings as A2) has generally a value ranging from 114 to 135 mm but optimize in this example for a value of 130 mm, which determines the point 12 on z coordinate. The seat cluster width (denoted in the drawings as A3) is determined for housing the diameter of the tube seat, which has generally a value ranging from 25.5 to 32 mm, but optimized in this example for a value of 27.2 mm, which determine the point 13 on z coordinate.

On the plane P0 (coordinates x and y) the sketch SK0 represents a geometry diamond frame layout comprising the main dimensional elements, for a frame size 52. The chain stays length determinate by axes A1 and A2 positions the seat tube length between axes A1 and A3, and subsequently seat angle, the top tube length, and bottom bracket height, the wheelbase the head angle and its rake. In all sizing frame, the amplitude of the three points defining the plane of the planar element has minimal variations, which can be easily adjusted with the coupling mechanisms design that will be described in detail later. The wheel clearance is not affected by standards wheels sizes and tires.

The frame structure defining two planes in this embodiment represents only one example. Preferred embodiments defining four and six planes are also possible and can be expanded for a plurality of cycle frames, including a plurality of planes configurations, but are not limited to those. Planar elements are in this instance made of panel type, either of composite material or of alloy metal swaged sheets, for the purpose of this description, but are not limited to those, as explained previously.

The planar elements can be trimmed in any of suitable ornamental shapes and maintaining respective structural frames' performance and strength characteristics necessary for the determinate bike and its use.

Determination of the shape of the cutouts will be determined mainly, but not solely, by the specified structural requirements for the use of the frame, in accordance with the selected material for the panel type element and its selected thickness. For an alveolar core type panel, edging process is realized by flange or co-extrusion process with a plurality of shapes. In addition, for homogenous core type panel, can be achieved by a chamfer, fillet, or their combination.

Figure 3:
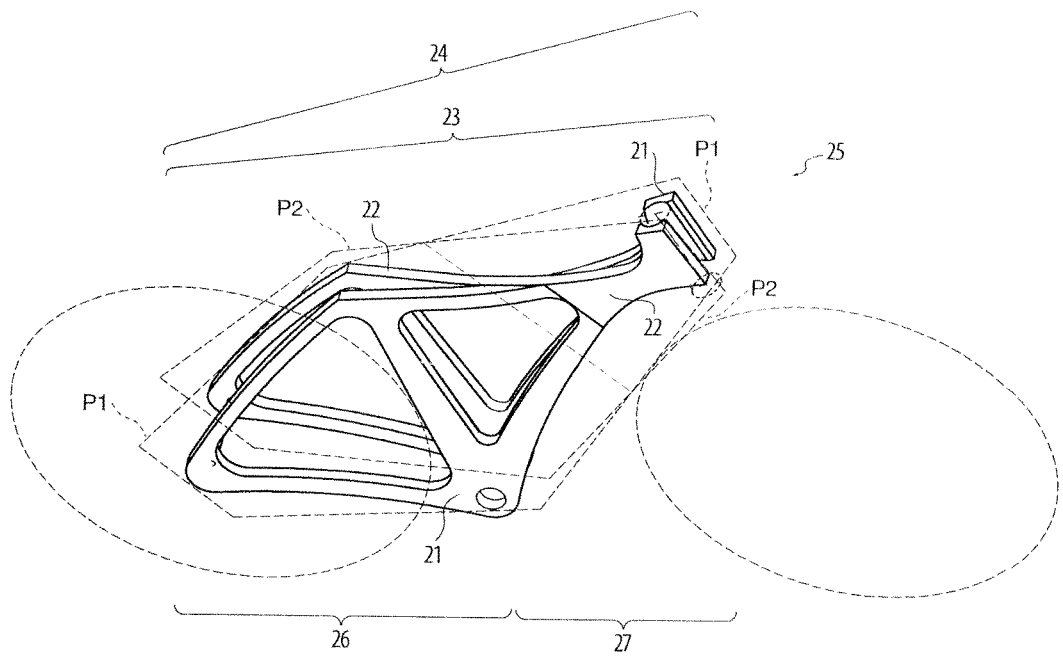
FIG. 3 illustrates a perspective view of the bicycle frame with two symmetrical planes in a diamond-shaped structure configuration.

Turning to FIG. 3, the frame assembly is similar to that known in the art. It is based on a typical diamond-shaped structure, although other designs are also contemplated. A frame 25 is described as follows: One of the present embodiments includes trimmed panel 21 defining plane P1 and the symmetrical trimmed panel 22 defining plane P2. The panels are best described with reference to their respective planes which together define a usual diamond-shaped frame 23 and the symmetrical diamond-shaped frame 24. Provided in pairs of planar elements, frames 23 and 24 constitute the frame 25 as a whole. Trimmed panels 21 and 22, on a conventional arrangement define rear 26 and front 27 triangles combination, comprise a top member, a down member, a seat member, a seat stay, and a chain stay.

Figure 4:
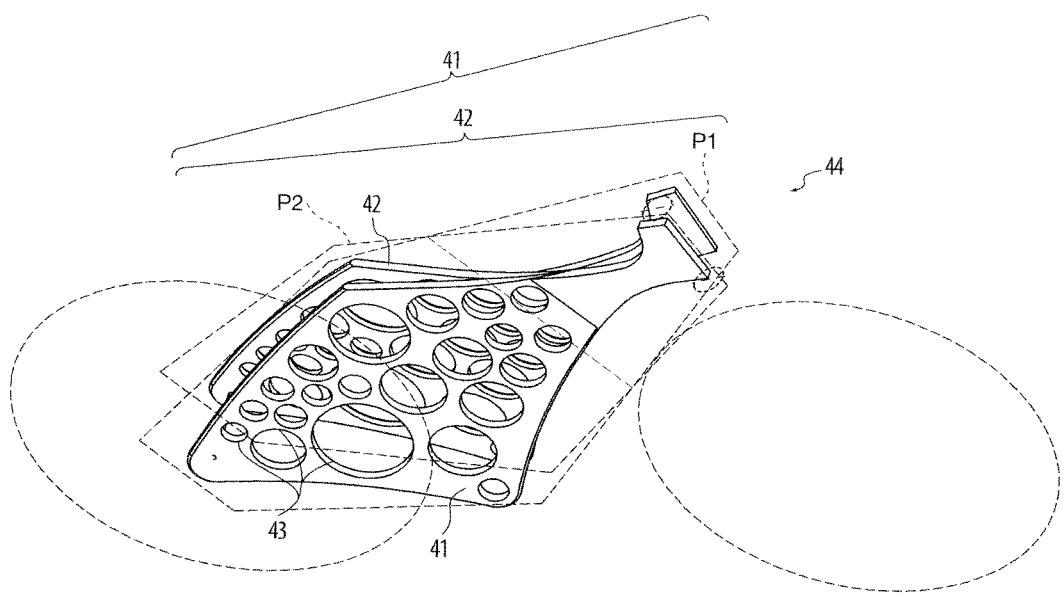
FIG. 4 is a perspective view of an alternate embodiment of the bicycle frame with two symmetrical planes with geometrically shaped openings.

Turning to FIG. 4 another embodiment is shown with an alternate cutout pattern. Panel 41 is positioned to define plane P1 and the symmetrical trimmed panel 42 defines plane P2. Respective panels include cutout pattern 43 and the symmetrically shaped frame. Provided in pairs of planar elements, they constitute the frame 44 in its whole. It is understood that the selected cutout patterns may be to address issues of material fatigue and static requirements (e.g. torsion, both axial and shearing deformation, bending about two axes) for imposed loads, chain-line clearance, and design ornamentation variants.

The interconnection between panels is achieved by coupling mechanisms at spindle axis, seat cluster locations and by means of shape matching join describe further. These coupling mechanisms are designed to integrate a bottom bracket shell components, a headset tube 160 with its components, and a tubing seat post, suitable to receive alternate standard pre-manufactured headset 160 or bottom bracket cartridge. The headset 160 between the planar elements (21, 22 and 41, 42) is a correlative of the three determinate coupling mechanisms. Meanwhile, by a combined association of matching forms of spike-mortise and fasteners, these coupling mechanisms can be dissembled and reassembled with simple tooling. Consequently, the selected planar elements are integral with the frame and can be replaced by another alternate, based on technical or aesthetic design criteria. The planar elements or panels become subsequently a modular component.

Figure 5:
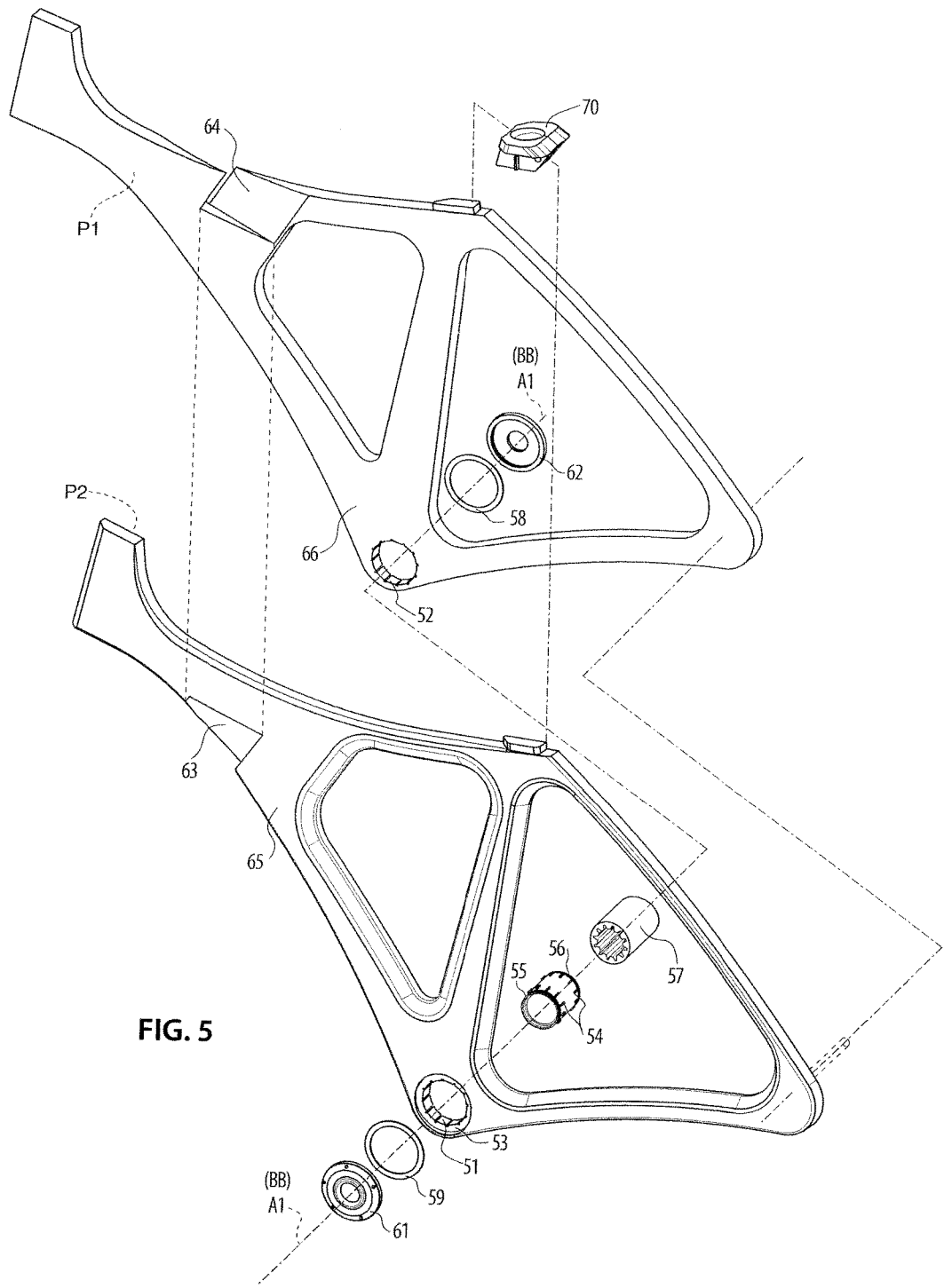
FIG. 5 is an exploded view of the bicycle frame with two symmetrical planes and its connectors.

FIG. 5 shows an exploded assembling system with two planes where the two planar panels interconnect on their reciprocate planes P1 (drive side) and P2 (non-drive side) at the axial spindle A1, (bottom bracket location (BB)). Both panels, on axis A1, comprised a bore through-hole 51 and 52 with a diameter that is about the same as the bushing outer diameter. At the two outer ends of the through-holes are CNC machined a shoulder hole 53. On the drive side panel 66, a partial counter borehole is machined with a diameter and a depth to create the necessary clearance space for the selected outer diameter front sprockets. On the non-drive side panel 65, the counter borehole diameter is flaring with the fascia for creating a complete cylindrical flat surface to received fastener assembly (described further).

Concentric with axis A1, a bushing (BSH) assembly is designed to house the so-called bottom bracket selected. Generally, a standard bottom bracket shell inner diameter value is ranging from 42 to 46 mm but optimize in this example for a value of 46 mm. The wall of the shell is around 5 mm for aluminum material alloy. On the outer cylinder of the bushing, a sleeve spacer 57 is fitted with both ends tapered to mate the panel 65 and 66. The bushing is axially movable and rotationally fixed relative to the panels. Both ends comport an array of keys 54 machined or forged, creating a meshing on the outer diameter of the bushing. This fastener extends through holes 51 and 52 in the support shoulder into engagement with the bushing to prevent rotation of the bushing. Ends are threaded, left-hand threaded for non-drive side 55, and right-hand threaded for drive side 56, on the outer cylindrical surface protruding from the outer fascias panels. The bushing receives a bearing ring 58 and 59 at its two threaded ends, and a lock ring 61 and 62, capturing the cartridge bottom bracket (not shown) and creating a rigid assembly receiving the crank system (not shown).

The assembly connection of the seat cluster 70 will be described in further detail with references to FIGS. 6 to 9. It is understood, depending on the nature of the composite structure of the panel, a person skilled in the art knows that the shoulder parallel to the centerline plane could be realized with metallic inserts. In this case, of the alveolar core, they can be protuberant from the outer panel fascia. In the case of solid core panels, there may be boring in the outer fascia (ABT).

The trimmed panels are shaped at their intersection line to engage by means of shape matching, 63, and a corresponding shape 64 to the secondary trimmed panel element to form a connection joint. In other words, respective trimmed panels include complementary fastening members that engage one another to form a joint connection. In this manner, machined such as sliding lap-joint configuration, with or without an additional means of connection.

Figure 6:
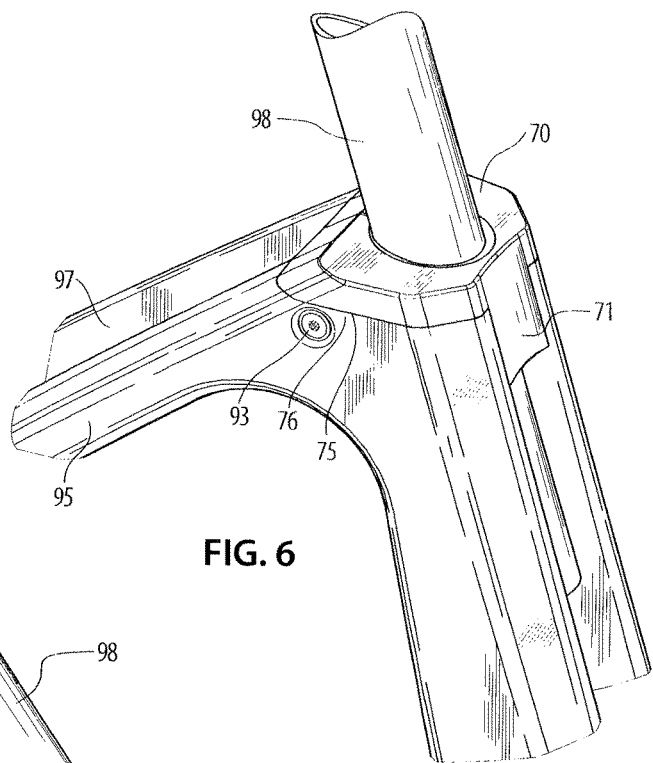
FIG. 6 is a perspective view of the seat cluster connector and panels assembled.
Figure 7:
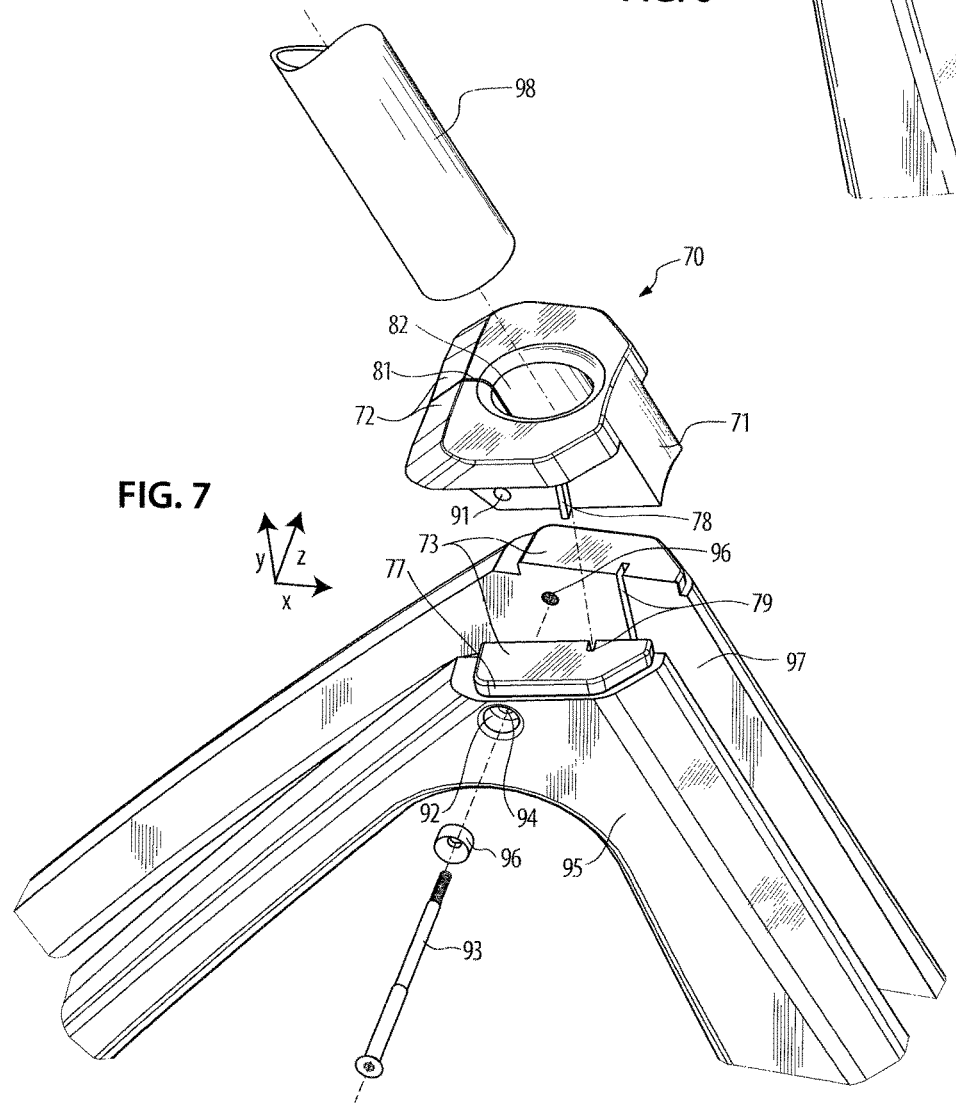
FIG. 7 is an exploded view of the seat cluster connector and panels.
Figure 8:
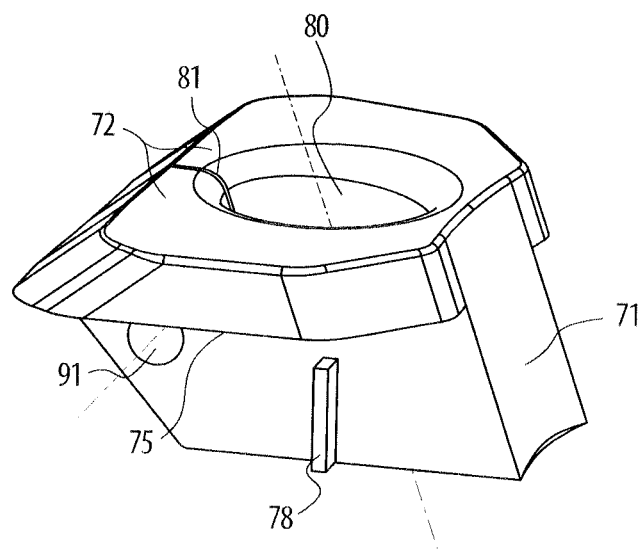
FIGS. 8 & 9 are perspective views of seat cluster connector.
Figure 9:
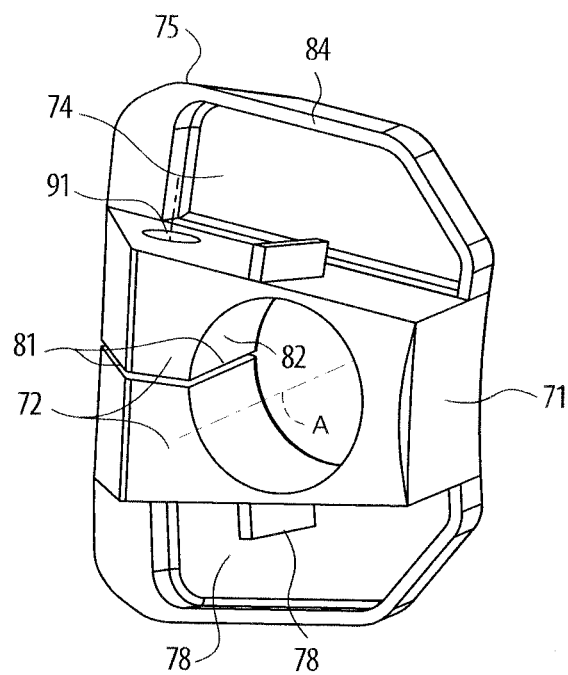

The assembly connection of the seat cluster of the present invention is best seen by references to FIGS. 6 to 9 at the seat location. More specifically, the embodiments shown in FIGS. 6 and 7 are related to four planes frame structure described further with reference to FIGS. 10 to 13, but a person skilled in the art knows that this mechanic fastener is similar in both configurations. These embodiments illustrate the cluster seat 70, as a device to the couple, upwardly the two panels elements on their reciprocate planes P1 and P2. The detailed description shall be contemplated as symmetrically similar for the non-drive and drive side. The device is CNC machined in this detail description, from a semi-solid casting aluminum alloy (SSM), but is not limited to this fabrication process, i.e. cast die, injection thermoforming, molding fiber composite, nanomaterials are also contemplated. The cluster seat connectors include a bridge block 71, combines with a barrel clamp in the center 72 and on the two sides a spike-mortise on both rear panels 65 and 66 (in two planes configuration FIG. 5) at seat cluster location. The shaped spike mortise 73 (FIG. 9) and its symmetrical 74, is delimited by a lip 84, forming an internal peripheral restraining surface. The outer lip side 75 flares all around at the lower end with the outer planar element surface 76. At this delineation, a flaring shoulder 76, start the shaped tenon 77, routed in the planar element. Lateral sides of the bridge block include also a key 78, fit into the coupling keyway 79, restraining from the axial rotation (x, y coordinates). From the upper flat surface, a through-hole 80, capture the seat post 98, on a determinate angular position. At the centerline (plane P0), a vertical slit 81 is machined vertically from the cylindrical rear inner face of hole 82 to the rear face throughout, forming a barrel clamp. Relative to this vertical slit, a cross-bore hole 91 is drilled in the side of the block. On the drive side of the panel element, concentric to cross-bore hole 91, a cross-bore and counterbore or countersunk is bored at its entrance 92 to the selected load bearings fasteners. A binding bolt 93 passes successively through a hole 94 in panel 95 and its bushing 96, secondly through the cross-bore hole 91, and finally fit behind the aluminum block in the threaded metallic insert 96 of the panel 97. When the seat post 98, is inserted in through-hole 80 and then tightened, the preloaded binding bolt 93, the seat post is secure by means of barrel clamp.

Hence, seat cluster 70 is turned in a coupling device by a combined means of fasteners including a CNC machined block bridging panels 95 and 97 by means of two lateral spike-mortises 73 and 74, a barrel clamp 72, and a load-bearing fastener 93, but not limited to one which captured a tubular seat post 98 by tightening.

It is understood that the headset 160 is the set of components on a bicycle that provides a rotatable interface between the bicycle fork and the head tube of the bicycle frame. The headset (HS) (FIG. 12) couples forwardly the two trimmed panels on their reciprocate planes P1 and P2. The headset coupling device is similar to the seat cluster coupling device described above and includes similar spike-mortises and tenons.

The headset housing (160), is split between an upper head, and a lower head. The upper head is CNC machined in this detail description, from a semi-solid casting aluminum alloy (SSM), but not limited to this. The upper head shape in an elongated T form comprises from the upper end: a shaped through-hole on the axial headset, receiving on both sides, a mortise. A lip, forming an internal peripheral restraining surface, delimits the shaped mortise. As appreciated by one of ordinary skill in the bicycles arts, the inner surface of the through-hole is designed to be suitable, when assembling to the lower head, and then continuous, to house a threadless headset (e.g., traditional, semi-integrated, or integrated headset). The lower end has a counterbore cylindrical cavity. The mortise outer lip side flares all around at the lower end with the outer planar element surface. At this delineation, a flaring shoulder, start the shaped tenon, machined in the planar element.

Similarly, the lower head, is partially symmetrical from the top assembly, relative to a plane perpendicular to the headset axis. More precisely comprise a shaped borehole, with the same diameter as borehole on the axial headset, receiving on both sides, a mortise. A lip, forming an internal peripheral restraining surface, delimits the shaped mortise. The outer lip side flares all around at the lower end with the outer planar element surface. At this delineation, a flaring shoulder, start the shaped tenon, machined in the planar element.

This coupling device includes a combination of different mechanical fastener types, glue or welding not being involved, assembling, disassembling, and reassembling process is straightforward.

Figure 11:
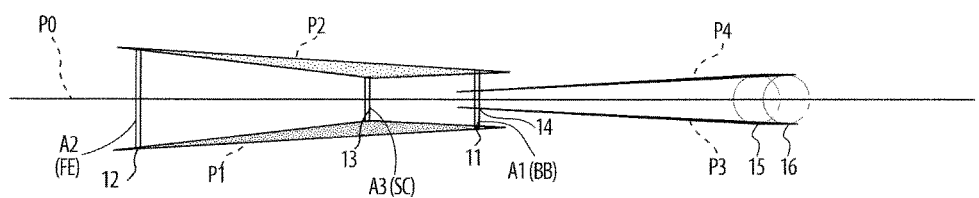
FIG. 11 is a top view of the tridimensional frame structure comprising four symmetrical planes.

Another alternative embodiment of the two planes frame structure is illustrated in FIG. 10 and FIG. 11 with the tridimensional structure with four planes, defining the construction of the frame in its whole. The plane P0 is representing the reference feature: frame centerline as a vertical plane of symmetry (coordinates x and y) running from the headset axis, and by the center of the bottom bracket shell and dropout spacing. The geometry of the bike frame is two-dimensionally sketched SK0 on plane P0 as references only and varied accordingly. The rear elements, described as rear triangles 125 are defined by the coordinates describe hereafter. In the perpendicular axial direction of P0 (coordinate z), are indicated: the axial spindle length A1 as the standard width of so-called bottom bracket (BB) location, the axis A2 as the standard spacing at the fork ends (FE) (drop out spacing) location, and the axis A3 the width at the seat cluster (SC) location. The plane P1 (drive side) is defined as running by three points: point 11 at the bottom bracket assembly, point 12 at the fork ends spacing and point 13 at the seat post cluster. Plane P2 (non-drive side) is the symmetrical plane of P1 relative to the centerline plane P0. The front elements, described as step-through 126 are defined by the coordinates describe hereafter. In the perpendicular axial direction of P0 (coordinate z), are indicated: the axial spindle length A1 as the standard width of so-called bottom bracket (BB) location. The plane P3 is defined as running by three points: point 14 at the bottom bracket assembly, points 15 and 16 at the headset location (FIGS. 10-11). Plane P4 is the symmetrical plane of P3 relative to the centerline plane P0.

Figure 12:
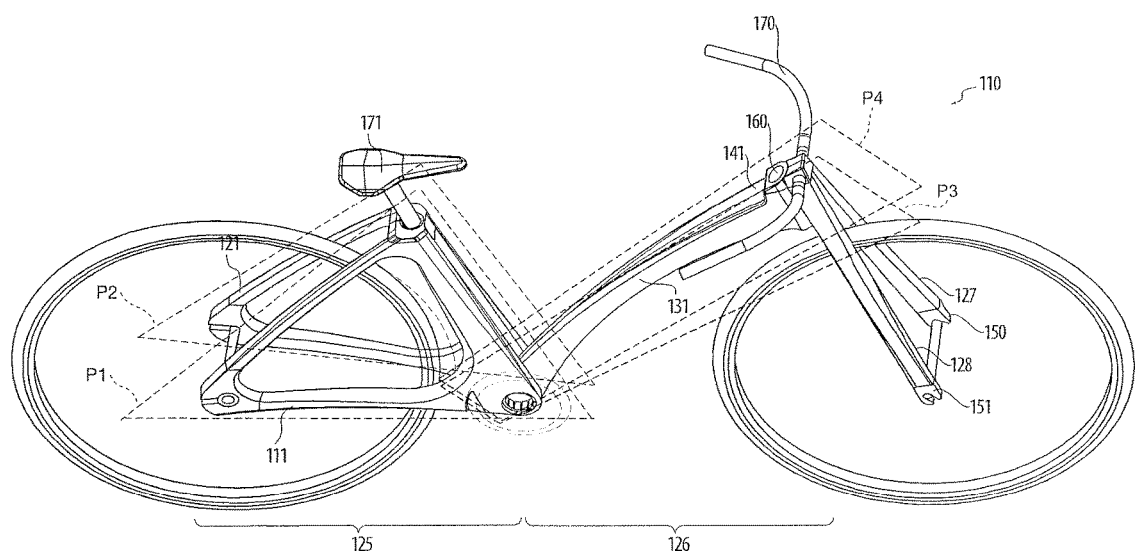
FIG. 12 illustrates a perspective view of the bicycle frame with four symmetrical planes in a step-through frame configuration.
Figure 13:
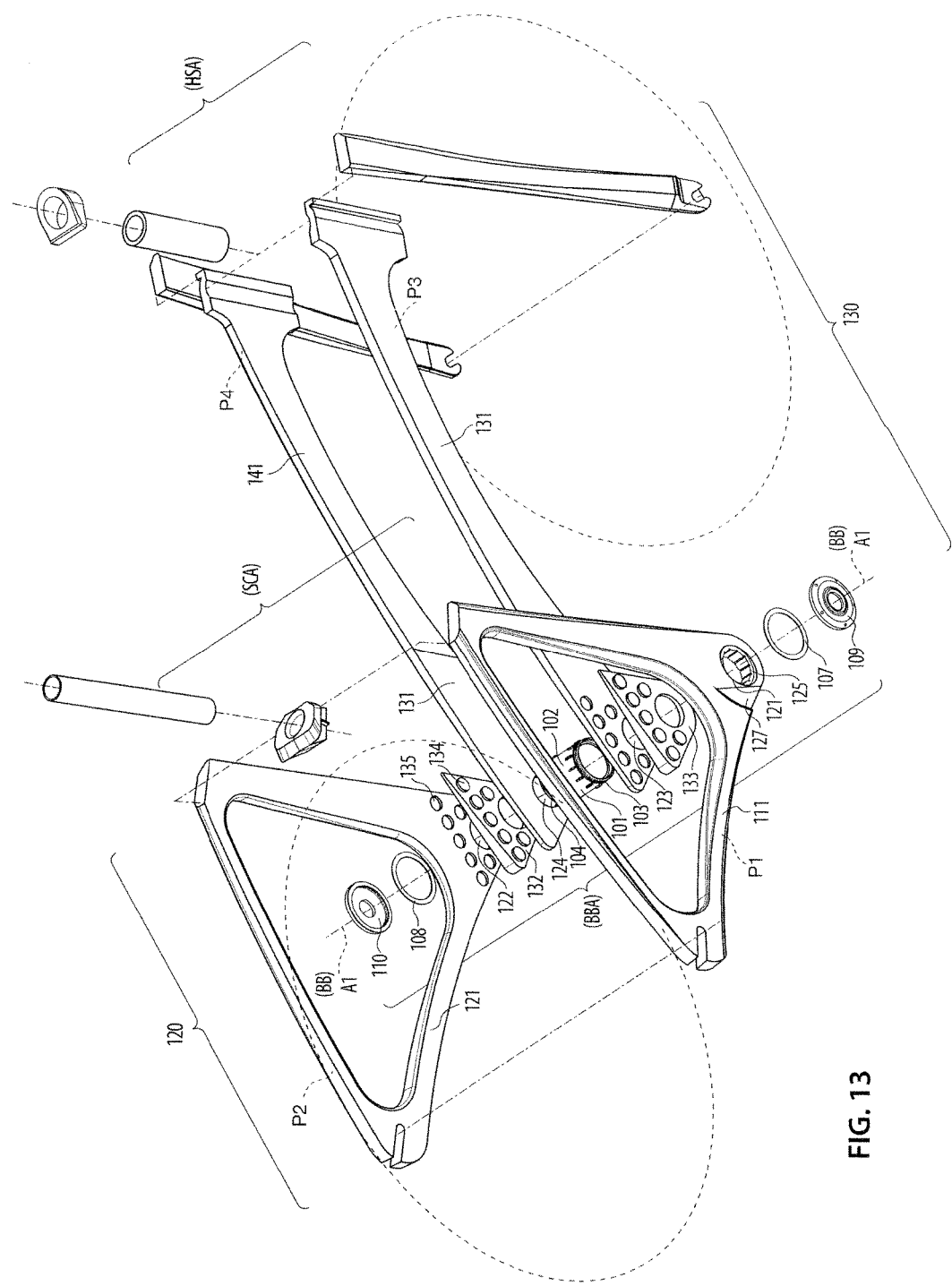
FIG. 13 is an exploded view of the bicycle frame with four symmetrical planes and its connectors.

Turning to FIG. 12, the frame assembly is similar to that known in the art. Accordingly, FIG. 12 shows elements of a bicycle frame, including a heatset 160, fork wheel connections 150 and 151, a steering bar 170, a seat or saddle post 171, and cluster assembly. The frame is based on a typical step-through structure frame, although other designs are also contemplated. The frame 110 includes a trimmed panel 111 (also referred to as a left trimmed panel 111) that defines plane P1, a trimmed panel 121 (also known as a right trimmed panel 121) that defines P2, to position trimmed panel 131 (also known as a left front arm trimmed panel 131) also in plane P1, and to position trimmed panel 141 (also known as a right front trimmed panel 141) also included on plane P4. Respective left and right front arm trimmed panels 131, 141 are operatively coupled to respective left and right trimmed panels 111, 121. The planes are positioned such that the planes intersect as described previously. Together, the panels referenced in this paragraph construct a step-though structure frame 110 having two planes (FIG. 12). In other words, provided in pairs the trimmed panels constitute the frame 110 in its whole. Trimmed panels 111 and 121 on a conventional arrangement outline rear triangle 125 including a seat member, a seatstay, and a chain stay. In addition, trimmed fork panels 131 and 141, form a step-through framework 126. The two trimmed fork panels 127 and 128 inserted in symmetrical respective planes define an offset fork arrangement planes on a conventional arrangement. Proximal ends of respective fork panels 127, 128 are operatively coupled to distal ends of respective left and right front trimmed panels 131, 141.

Turning to F13, another embodiment shows the exploded assembly system having trimmed panels that define four planes, to interconnect the four panels elements on their reciprocate planes P1 & P3 (drive side) and P2 and P4 (non-drive side) at the axial spindle A1, (bottom bracket location BB).

The two pairs of panels (P1, P2) and (P3, P4), on axis A1, comprise bore through-holes 121, 122, 123 and 124 each with a diameter that is about the same as the bushing outer diameter.

At the two outer ends of panels 111 and 121 (axis A1) are CNC machined a shoulder hole 125 (illustrated only on panels 111). On the non-drive side, panel 121 includes a shoulder hole diameter that is flaring with the fascia for creating a complete cylindrical flat surface to receive a bearing ring and a lock ring identical as the drive side in the fastener assembly (described below). On the drive side panel 111, a partial counterbore hole 127 (on axis A1) is machined with a diameter and a depth to create the necessary clearance space for the selected outer diameter front sprockets.

Concentric with axis A1, a bushing assembly 101 is designed to house the bottom bracket. Generally, a standard bottom bracket shell inner diameter value is ranging from 42 to 46 mm but is optimized in this example for a value of 46 mm. The wall of the shell is around 5 mm for aluminum material alloy. The bushing is axially movable and rotationally fixed relative to the panels. Both ends include an array of keys 102 machined or forged, creating a meshing on the outer diameter of the bushing. This fastener extends through holes 125 (panel 111) and 122 (panel 121) in the support shoulder into engagement with the bushing to prevent rotation of the bushing.

Ends are a left-hand thread for non-drive side 104 and a right-hand thread for drive side 103 on the outer cylindrical surface protruding from the outer fascia panels. The bushing receives at its two threaded ends a bearing ring 107 and 108 and a lock ring 109 and 110, capturing the cartridge bottom bracket and creating a rigid assembly receiving the crank system.

The bottom bracket assembly connection (BBA) fastens the front arm elements 130 with a symmetrical concentric undercut 131 parallel to the plane (P0) and the rear triangle pair elements 120 by means of an axial bushing fitted to house a bottom bracket, The angular difference relation between the planes (P1, P3) and (P2, P4) is interconnected by means of a wedge connection known as a bushing 133 (for planes P1, P3) and 132 (for planes P2, P4). There are configured in that each contact fascias be parallel to each contact planes and are configured to mate as described below and shown in FIG. 13. More particularly, the bushing assembly 101 include a plurality of dowels 134 or keys on its outer bushing panels 132 in pin fitting into a plurality of complementary holes or keyway 135 in the abutting bushing panel 133, each bushing panel being attached to a left or right rear triangle trimmed panel 111, 121, respectively. Those prevent or limit motion or slipping in a friction bushing (132 and 133) between the front arm pair (130) and the rear triangle pair (120) elements assemblies in x and y coordinates.

Similarly, to the tridimensional frame structure comprising two planes, the connections at headset (HS) and seat cluster (SC) are identical in the structure comprising two planes (FIGS. 1 to 5).

The trimmed panels may include a brace device to house accessories or for mechanical purpose or and airflow and drag control. The brace devices are housing conventional stranding brake and or, gear, or electrical cables routing, but are not limited to those. They can be situated in between parallel planar elements (i.e. between trimmed panels) as front arm seat, seat tube location, and or, parts of the portion of the planar element as chain stays and seat stays, but are not limited to those.

The trimmed panels described above may include a plurality of holes or bores having geometric patterns (FIG. 4) as described above. Further, the trimmed panels may be constructed of material taken from a group that includes alloys of aluminum, magnesium, titanium, organic and inorganic fibers, thermoplastic polymers, synthetic fibers, nanomaterial and nano-cellulose fiber (C.N.F.). Still further, the trimmed panels or any other planar elements may be constructed using processes and methods including coating, weaving, molding, laminating, extrusion, or co-extrusion, swaging.

Thus, specific compositions and methods of cycle frame using only planar elements have been disclosed. It should be apparent, however, to those skilled in the art that many more modifications besides those already described are possible without departing from the inventive concepts herein. The inventive subject matter, therefore, is not to be restricted except in the spirit of the disclosure. Moreover, in interpreting the disclosure, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. In the following description, for purposes of explanation, numerous specific details are set forth in order to provide a thorough understanding this technology. It will be apparent, however, that this technology can be practiced without some of these specific details. In other instances, structures and devices are shown in block diagram form in order to avoid obscuring the innovative aspects. For example, the present technology is described in some implementations below with reference to particular hardware.

Reference in the specification to "one implementation or embodiment" or "an implementation or embodiment" simply means that a particular feature, structure, or characteristic described in connection with the implementation or embodiment is included in at least one implementation or embodiment of the technology described. The appearances of the phrase "in one implementation or embodiment" in various places in the specification are not necessarily all referring to the same implementation or embodiment.

Accordingly, the disclosure of the present invention is intended to be illustrative, but not limiting, of the scope of the present invention, which is set forth in the following claims.

What is claimed is:

1. A bicycle frame assembly for a bicycle having a headset, end forks, seat tube, chain stay, seat stay, seat receiver, and bottom bracket, said bicycle frame assembly comprising:
   a left rear triangle trimmed panel having a planar configuration defining a first plane;
   a right rear triangle trimmed panel having a planar configuration defining a second plane;
   a left front arm trimmed panel having a planar configuration situated in said first plane;
   a right front arm trimmed panel having a planar configuration situated in said second plane;
   wherein respective planes are intersecting planes that are associated with a diameter of the headset, seat receiver, bottom bracket, and end forks of the bicycle.

2. The bicycle frame assembly of claim 1, wherein the left and right front arm trimmed panels define a front arm profile and wherein the right rear triangle trimmed panel defines a rear triangle profile that is associated with the seat post, a chain stay, and seat stay of the bicycle.

3. The bicycle frame assembly of claim 1, wherein respective trimmed panels are edged with a flange, a chamfer, fillet, or combinations thereof.

4. The bicycle frame assembly of claim 1, wherein the left rear triangle trimmed panel and said right rear triangle trimmed panel have planar configurations and are coupled rigidly at the headset of the bicycle with fastening mechanisms.

5. The bicycle frame assembly of claim 1, wherein the left and right triangle trimmed panels are coupled together via a spike-mortise connection for quick assembly or disassembly.

6. The bicycle frame assembly of claim 1, wherein the left and right triangle trimmed panels are coupled upwardly at a seat cluster location of the bicycle via a spike-mortise connection.

7. The bicycle frame assembly of claim 1, wherein the left and right triangle trimmed panels and proximal ends of the left and right front arm trimmed panels are coupled together with a bushing assembly.

8. The bicycle frame assembly of claim 7, wherein said bushing assembly includes:
   a bushing panel coupled to said left rear triangle trimmed panel and having a plurality of dowels; and
   another bushing panel coupled to the right rear triangle trimmed panel and defining a plurality of holes selectively receiving the plurality of dowels so as to limit motion of the left and right front arm trimmed panels.

9. The bicycle frame assembly of claim 8, wherein the bottom bracket of the bicycle is coupled to the left and right triangle trimmed panels and to left and right front arm trimmed panels via the bushing assembly.

10. The bicycle frame assembly of claim 1, wherein the left and right triangle trimmed panels include a plurality of geometric patterns and are constructed of material taken from a group that includes alloys of aluminum, magnesium, titanium, organic and inorganic fibers, thermoplastic polymers, synthetic fibers, nanomaterial, nano-cellulose fiber (C.N.F.), thermoformed material, organic or inorganic materials.

* * * * *